United States Patent Office 3,652,764
Patented Mar. 28, 1972

3,652,764
ANTIMICROBIAL COMPOSITIONS AND
METHODS OF USE
Vincent Lamberti, Upper Saddle River, N.J., and Henry Lemaire, Westport, Conn., assignors to Lever Brothers Company, New York, N.Y.
No Drawing. Continuation-in-part of application Ser. No. 502,299, Oct. 22, 1965, now Patent No. 3,427,248. This application Nov. 14, 1968, Ser. No. 775,960
The portion of the term of the patent subsequent to Feb. 11, 1986, has been disclaimed
Int. Cl. A01n 9/00, 9/12, 9/14
U.S. Cl. 424—235                              15 Claims

ABSTRACT OF THE DISCLOSURE

The specification is concerned with an antimicrobial agent which is a polyolether, polyolpolyether or sulfur analog thereof. It is also concerned with a composition containing these antimicrobial agents.

This application is a continuation-in-part of application Ser. No. 502,299 filed Oct. 22, 1965, now U.S. Pat. No. 3,427,248.

It has now been discovered that certain polyolethers and polyolpolyethers and thioether analogs have antimicrobial activity. Furthermore, a composition can be formed from one of these compounds as the only antimicrobial agent, from one of these compounds in combination with another antimicrobial agent which is known in the art or from one of these compounds in combination with an inert carrier.

The new antimicrobial agents can be defined by three generic structures as follows:

(I)
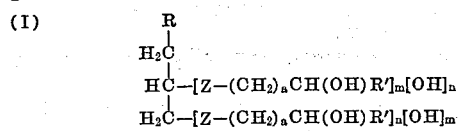

wherein R is an aliphatic saturated hydrocarbon group having 7–11 carbon atoms; Z is oxygen, sulfur or sulfoxide; $a$ is 1 or 2; $m$ is 0 or 1; $n$ is 0 or 1; $m+n$ all occurrences is 1; and R' is $CH_2OH$ or $CH_3$.

(II)
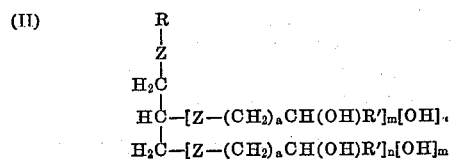

wherein R is an aliphatic saturated hydrocarbon group having 8–14 carbon atoms when R' is H or having 8–13 carbon atoms when R' is $CH_2OH$ or $CH_3$; Z is oxygen, sulfur or sulfoxide; $a$ is 1 or 2; $m$ is 0 or 1; $n$ is 0 or 1; $m+n$ all occurrences is 1; and R' is H, $CH_2OH$ or $CH_3$.

(III)
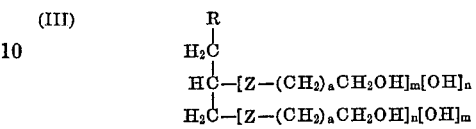

wherein R is an aliphatic saturated hydrocarbon group having 7–12 carbon atoms; Z is oxygen, sulfur or sulfoxide $a$ is 1 or 2; $m$ is 0 or 1; $n$ is 0 or 1; and $m+n$ all occurrences is 1.

Any known method may be employed to prepare the aforementioned polyolethers and polyolpolyethers and sulfur analogs thereof. However, the preferred method is to react a long chain epoxide or long chain glycidyl ether with a polyhydroxy compound, such as, ethylene glycol or glycerol, in the presence of an acid catalyst, e.g., $SnCl_4$, or a basic catalyst, e.g., $NaOCH_3$. The reaction can also be carried out without a catalyst, but in such cases, longer reaction times are required. If the reaction product is a thioether, it can be oxidized, for example with t-butyl hydroperoxide in methanol, to form the corresponding sulfoxide. It is also possible to react either a long chain diol or a monoalkyl ether of glycerol with one molar proportion of ethylene oxide. By this process, however, a mixture of products is obtained containing large proportions of unreacted starting diol or ether, with some mono-ethoxylated compound with which this invention is concerned, and with some poly-ethoxylated compounds such as those represented by the formula $$RCH(OH)CH_2O(CH_2CH_2O)_xH$$

wherein $x$ is greater than 1.

If a long chain epoxyalkane is a reactant, it may be obtained by any suitable method. For example, an alkene may be oxidized directly in the presence of a catalyst or a chlorhydrin may be reacted with sodium hydroxide. Similarly, if a long chain diol is a reactant, it may be obtained by any suitable method, such as the oxidation and hydration of olefins and the hydrolysis of chlorhydrins.

The following short chain polyhydroxy reactants among others are suitable:

Short Chain Polyhydroxy Reactant

| a | R' | Z | Name | Structure |
|---|---|---|---|---|
| 1 | H | O | Ethylene glycol | $HOCH_2CH_2OH$ |
| 1 | $CH_2OH$ | O | Glycerol | $HOCH_2CH(OH)CH_2OH$ |
| 1 | $CH_3$ | O | 1,2-propanediol | $HOCH_2CHOHCH_3$ |
| 1 | H | S | 2-mercapto ethanol | $HSCH_2CH_2OH$ |
| 1 | $CH_2OH$ | S | 3-mercapto-1,2-propanediol | $HSCH_2CH(OH)CH_2OH$ |
| 1 | $CH_3$ | S | 1-mercapto-2-propanol | $HSCH_2CHOHCH_3$ |
| 2 | H | O | 1,3-propanediol | $HO-CH_2-CH_2-CH_2OH$ |
| 2 | $CH_2OH$ | O | 1,2,4-butanetriol | $HOCH_2CH_2CH(OH)CH_2OH$ |
| 2 | $CH_3$ | O | 1,3-butylene glycol | $HOCH_2CH_2CH(OH)CH_3$ |
| 2 | H | S | 3-mercapto-1-propanol | $HSCH_2CH_2CH_2OH$ |
| 2 | $CH_2OH$ | S | 4-mercapto-1,2-butanediol | $HSCH_2CH_2CH(OH)CH_2OH$ |
| 2 | $CH_3$ | S | 4-mercapto-2-butanol | $HSCH_2CH_2CH(OH)CH_3$ |

Preferred compounds in this invention among others include polyethers, such as 2-hydroxydodecyl 2'-hydroxyethyl ether having the structure:

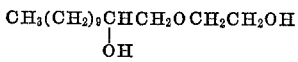

and 2-hydroxydodecyl glyceryl ether having the structure:

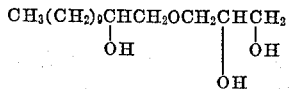

and polyolpolyethers, such as α-decyl-α'-hydroxyethyl glyceryl diether having the structure:

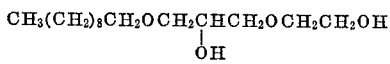

The compounds of the present invention may be used alone as antimicrobial agents to combat bacteria, molds, fungi, yeasts, gums and other microbes. The following microbes, among others, are killed or inhibited when subjected to the compounds of the invention: *Staphylococcus aureus* (S.a.), *Micrococcus candidus* (M.c.), *Streptococcus faecalis* (S.f.), *Pityrosporum ovale* (P.o.), *Aspergillus niger* (A.n.), *Oöspora*, *Chaetomium globosum* (C.g.), *Candida albicans* (C.a.), *Salmonella chloreraesius* (S.c.), *Escherichia coli* (E.c.) and *Staphylococcus epidermidis* (S.e.).

The compounds of the invention may also be used with other compounds to provide an antimicrobial composition. The other compound may be an inert carrier or it may also be an antimicrobial agent. An inert carrier is defined herein as at least one compound or component which is not an antimicrobial agent and which is not a surface active agent. This, therefore, includes solids, such as silica; liquids, such as water and alcohol; and gases, such as halogenated hydrocarbons for aerosol propellants. A liquid antimicrobial composition is frequently prepared in a solution or dispersion containing (1) a compound of the invention and (2) water, a lower aliphatic monohydric or polyhydric alcohol, such as methanol, ethanol, propanol, glycol or hexylene glycol, or some other solvent, such as acetone and xylene sulfonate.

The composition may also be a blend of antimicrobial agents in which (1) at least one component is a compound of the invention and (2) at least one component is some other compound having antimicrobial properties. These other compounds may be any well known germicides or the like including the following without limitation: the normal and alkali metal salt forms of 4'-monobromosalicylanilide, 5-monobromosalicylanilide, 4',5-dibromosalicylanilide (DBS), 33,5-dibromosalicylanilide, 3,4',5-tribromosalicylanilide (TBS), 3,4',5-trichlorosalicylanilide, 3,3', 4',5-tetrachlorosalicylanilide, 3,4,4' - trichlorocarbanilide (TCC); Hexachlorophene [2,2'-methylene-bis (3,4,6-trichlorophenol)]; o-phenylphenol; 4,2',4' - trichloro-2-hydroxy-diphenyl ether; 2-tridecyl imidazoline; cetyl trimethyl ammonium bromide; lauryl pyridinium bromide; lauryl isoquinolinium bromide, and mixtures thereof.

It is also within the scope of this invention to form a composition contaiinng (1) a new compound described above having antimicrobial properties, (2) some other known compound having antimicrobial properties as described above and (3) an inert carrier as described above. When the antimicrobial composition contains a compound of the invention and an inert carrier, the range of the compound is generally about 0.005% to 95%, preferably about 0.005% to 20%, and the range of the inert carrier is generally about 99.995% to 5%, preferably about 99.995% to 80%. When the composition contains a blend of antimicrobial agents, the compound within the scope of the invention usually ranges from about 1% to 99%, preferably about 25% to 75%, and the other compound ranges from about 99% to 1%, preferably about 75% to 25%. The composition may also have about 0.005% to 95%, preferably about 0.005% to 20% of a new antimicrobial agent described heretofore; about 0.005% to 95%, preferably about 0.005% to 2%, of another known antimicrobial agent; and about 99.99% to 1%, preferably about .78% to 1% of an inert carrier.

Thus, in accordance with this invention, it has been found that certain compounds have excellent antimicrobial properties. The compounds include the following among others: 2-hydroxydodecyl 2'-hydroxyethyl ether; 2-hydroxydecyl glyceryl ether; 2 - hydroxydodecyl glyceryl ether α-decyl-α'-hydroxyethyl glyceryl diether; α-dodecyl-α'-hydroxyethyl glyceryl diether; α-C$_{12}$–C$_{13}$ alkyl-α'-hydroxyethyl glyceryl diether; 2-hydroxy-C$_{11}$–C$_{14}$ alkyl glyceryl ether; 2 - hydroxydecyl 2' - hydroxyethyl ether; 2-hydroxy-C$_{11}$–C$_{14}$ alkyl 2'-hydroxyethyl ether; 2-hydroxytetradecyl glyceryl ether; 2-hydroxytetradecyl 2'-hydroxyethyl ether; 2-hydroxytetradecyl 3'-hydroxypropyl ether; 2-hydroxytetradecyl 2'-hydroxypropyl ether; 2-hydroxydecyl - 2' - hydroxypropyl ether; 2-hydroxdodecyl-2'-hydroxypropyl ether; 2-hydroxydodecyl 3'-hydroxypropyl ether; 2-hydroxytetradecyl 3'-hydroxybutyl ether; 2-hydroxydodecyl 2'-hydroxyethyl thioether; 2-hydroxydodecyl 2'-hydroxyethyl sulfoxide; 2-hydroxy-C$_{11}$–C$_{14}$ alkyl 2'-hydroxyethyl thioether; α-octyl-α'-hydroxyethyl glyceryl diether; α-dodecyl-α'-(3,4-hydroxybutyl) glyceryl diether and α-undecyl - α' - hydroxyethyl glyceryl di(thio)ether. These compounds may be employed alone or they may be combined with other know compounds having antimicrobial properties or with an inert carrier.

The following examples are submitted to illustrate but not to limit this invention. Unless otherwise indicated, all parts and percentages in the specification and claims are based upon weight.

EXAMPLE I

The compound, 2 - hydroxydodecyl 2' - hydroxyethyl ether, was prepared as follows. A solution of 1 ml. stannic chloride in 434 g. (7.0 moles) ethylene glycol was stirred at 135°–150° C. while 129 g. (0.63 mol; 90% purity) 1,2-epoxydodecane were added dropwise over a thirty minute period. The solution was held at about 140° C. for an additional hour after which a solution of 8 g. sodium carbonate in 32 g. water was added to neutralize the catalyst. The reaction product therefrom was stripped of excess ethylene glycol (up to 109° C. at 16 mm.). The crude product remaining was filtered and distilled subsequently at reduced pressure.

The compound, 2-hydroxydodecyl alkyl glyceryl ether, was prepared by adding 160 g. (0.87 mol) 1,2-epoxydodecane dropwise over 50 minutes with stirring at 125° C. to 400 grams (4.35 moles) glycerol (synthetic grade, min. 99.5%) containing 1.7 g. stannic chloride. Shortly after addition had started, the solution became cloudy and two phases developed subsequently. The solution was stirred two additional hours. The catalyst was then neutralized by the addition of 4 g. sodium bicarbonate in 200 ml. water and the product was taken up in water and ether. The ether layer was washed and dried, and the solvent was removed therefrom followed by vacuum distillation.

The compound, α-decyl-α'-hydroxyethyl glyceryl diether, was prepared by the addition of 35 g. (0.16 mole) decyl glycidyl ether to 40 g. (0.65 mole) ethylene glycol containing 0.2 ml. of stannic chloride at 125° C. over 0.5 hour. The solution was stirred an additional hour at 135° C. Sodium carbonate was added to destroy the catalyst, excess glycol was stripped off, and the residue was distilled.

The germicidal (antimicrobial) activity of these compounds was determined by the Streak Gradient Plate Method. The Streak Gradient Plate Method is a modification of the gradient plate method of Szybalski, Science 116: 46–48 (1952), for the determination of germicide MEC (Minimum Effective Concentration) values. This method employs streaks of several organisms per plate. The results are indicated in Table 1.

TABLE 1.—GERMICIDAL ACTIVITY BY STREAK GRADIENT PLATE METHOD

| Compound | Minimum Effective Concentration (MEC) in p.p.m. | | | | | | | |
|---|---|---|---|---|---|---|---|---|
| | Sa | Mc | Sf | Ca | Ec | Sc | Cg | An |
| Test A: | | | | | | | | |
| 2-hydroxydodecyl glyceryl ether (I) | | | | 42 | | | 28 | |
| Syndet [a] | | | | 2,300 | | | 335 | |
| Triacetin | | | | 25,000 | | | 3,550 | |
| Test B: | | | | | | | | |
| 2-hydroxydodecyl glyceryl ether (I) | 37.4 | 66.5 | 30.0 | 25.6 | >100 | >100 | | |
| Trichlorocarbanilide (TCC) | 0.15 | >100 | >100 | >100 | >100 | >100 | | |
| Test C: | | | | | | | | |
| 2-hydroxydodecyl 2'-hydroxyethyl ether (III) | | | | 38 | | | | 36 |
| α-Decyl-α'-hydroxyethyl glyceryl diether (II) | | | | 100 | | | | 72 |
| 2-hydroxydodecyl glyceryl ether (I) | | | | 52 | | | | 56 |

[a] Commercial built detergent based on sodium mixed $C_{12}$-$C_{15}$ polypropylenebenzenesulfonate.
(I) Within the scope of structure (I) described heretofore.
(II) Within the scope of structure (II) described heretofore.
(III) Within the scope of structure (III) described heretofore.

As demonstrated in Table 1, the compounds of the invention have high antimicrobial activity.

EXAMPLE II

The compounds listed in Table 2 were prepared by the same method described in Example I or by a similar method by varying the reactant. The antimicrobial activity of the compounds was determined by the procedure of Example I. The results are also listed in Table 2.

This example demonstrates that the compounds within the scope of this invention are suitable antimicrobial agents.

EXAMPLE III

Several compounds of the invention were compared with other compounds with respect to antimicrobial properties. The compounds and results are indicated in Table 3.

TABLE 3.—GERMICIDAL ACTIVITY BY THE GRADIENT STREAK PLATE METHOD

| Compounds | Minimum Effective Concentration (MEC) in p.p.m. | | | | |
|---|---|---|---|---|---|
| | Sa | Mc | Sf | Ca | An |
| 2-hydroxydodecyl hydroxyethyl ether (III) | 36 | 51 | 25 | 34 | 18 |
| 2-hydroxy $C_{11}$-$C_{14}$ alkyl hydroxyethyl ether (III) | 50 | 111 | 28 | 100 | 27 |
| Alfonic 1418-6 [a] | >10,000 | >10,000 | >10,000 | >10,000 | >10,000 |
| Sterox DJ [b] | >10,000 | >10,000 | >10,000 | >10,000 | >10,000 |

(III) Within the scope of structure (III) described above.
[a] Ethoxylated mixture of long chain primary alcohols in which about ⅔ has 14 carbons and ⅓ has 12 carbons.
[b] Dodecylphenol with about 10 mols of ethylene oxide.

It is evident from this example that the compounds within the purview of the present invention have superior antimicrobial properties.

TABLE 2.—GERMICIDAL ACTIVITY BY THE GRADIENT PLATE METHOD

| Compounds | Minimum Effective Concentration (MEC) in p.p.m. | | | | |
|---|---|---|---|---|---|
| | Sa | Se | Sf | Po | An |
| 2-hydroxydecyl hydroxyethyl ether (III) | 250 | 210 | 280 | 160 | 50 |
| 2-hydroxydodecyl hydroxyethyl ether (III) | 50 | 28 | 45 | 18 | 22 |
| 2-hydroxy $C_{11}$-$C_{14}$ alkyl hydroxyethyl ether (III) | 67 | 28 | 56 | 18 | 45 |
| 2-hydroxytetradecyl hydroxyethyl ether (III) | 100 | 25 | 35 | 22 | 17 |
| 2-hydroxyhexadecyl hydroxyethyl ether (c) | >1,000 | >1,000 | 67 | >1,000 | >1,000 |
| 2-hydroxyoctadecyl hydroxyethyl ether (c) | 1,000 | 1,000 | 1,000 | 500 | >1,000 |
| 2-hydroxydecyl 2-hydroxypropyl ether (I) | 220 | 220 | 250 | 170 | 130 |
| 2-hydroxydodecyl 2-hydroxypropyl ether (I) | 32 | 22 | 51 | 22 | 56 |
| 2-hydroxydodecyl hydroxyethyl thioether (III) | 18 | 13 (Mc) | 18 | | 5 |
| 2-hydroxydodecyl hydroxyethyl sulfoxide (III) | 132 | 72 (Mc) | 67 | | 106 |
| α-Decyl-α'-hydroxyethyl glyceryl diether (II) | 57 | 45 | | 25 | 25 |
| α-Dodecyl-α'-hydroxyethyl glyceryl diether (II) | 100 | 25 | | 22 | 45 |
| α-$C_{12-13}$ alkyl-α'-hydroxyethyl glyceryl diether (II) | 220 | 45 | | 33 | 50 |

(I) Within the scope of structure (I) described heretofore.
(II) Within the scope of structure (II) described heretofore.
(III) Within the scope of structure (III) described heretofore.
(c) Control.

EXAMPLE IV

The formulations in Table 4 are suitable antimicrobial compositions.

TABLE 4

| Ingredients | Formulation No., (percent) | | | | | | | | | |
|---|---|---|---|---|---|---|---|---|---|---|
| | 1 | 2 | 3 | 4 | 5 | 6 | 7 | 8 | 9 | 10 |
| 2-hydroxydecyl glyceryl ether (I) | 0.005 | | | | | | | | | |
| 2-hydroxytetradecyl 3'-hydroxybutyl ether (I) | | 1.0 | | | | | 1.0 | | | |
| α-Octyl-α'-hydroxyethyl glyceryl diether (II) | | | 10.0 | | | | | 8.0 | | |
| α-Dodecyl-α'-(3,4-hydroxybutyl) glyceryl diether (II) | | | | 5.0 | | | | | | |
| α-Undecyl-α'-hydroxyethyl glyceryl di(thio)ether (II) | | | | | 7.0 | | | | | |
| 2-hydroxydecyl 2'-hydroxyethyl ether (III) | | | | | | 15.0 | | | | |
| 2-hydroxytetradecyl 2'-hydroxyethyl ether (III) | | | | | | | 10.0 | | | 10.0 |
| G-11 [a] | | 0.2 | | | | | | | | |
| TBS | | | 0.5 | | | | | | | |
| DBS | | | | 0.5 | | | | | | |
| TCC | | | | | 1.0 | | | | | |
| o-Phenylphenol | | | | | | 2.0 | | | | |
| 4,2',4'-trichloro-2-hydroxy-diphenyl ether | | | | | | | 1.0 | Y | | |
| 2-tridecyl imidazoline | | | | | | | | 0.5 | | |
| Cetyl trimethyl ammonium bromide | | | | | | | | | 0.5 | |
| Lauryl pyridinium bromide | | | | | | | | | 0.5 | |
| Lauryl isoquinolinium bromide | | | | | | | | | | 0.5 |
| Ethyl alcohol | | 40.0 | | | 30.0 | | | 10.0 | 10.0 | 10.0 |
| Hexylene glycol | | | | 10.0 | | | | | | |
| Lauric diethanolamide | | 4.0 | 4.0 | | 4.0 | | | | | |
| Optical brightener [b] | | 0.1 | | | | | | | | |
| Polar Brilliant Blue RAW [c] | | 0.1 | | | | | | | | |
| Water | 99.995 | 58.8 | 85.3 | 80.5 | 62.0 | 79.0 | 89.0 | 88.5 | 81.0 | 79.5 |

[a] Hexachlorophene,
[b] Sodium salt of 2-(stilbyl-4'')-(naphtho-1',2',4,5)-1,2,3-triazole-2''-sulfonic acid,
[c] Colour Index 61585,
(I) Within the scope of structure (I) described heretofore,
(II) Within the scope of structure (II) described heretofore,
(III) Within the scope of structure (III) described heretofore, Having set forth the general nature and specific embodiments of the present invention, the true scope is now particularly pointed out in the appended claims.

We claim:

1. A method for combating microbes selected from the group consisting of bacteria, fungi, molds and yeasts which comprises subjecting said microbes to an antimicrobially effective amount of an antimicrobial agent having the structure (I), structure (II) or structure (III); said structure (I) being:

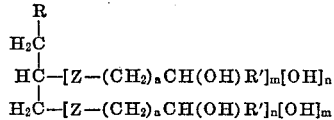

wherein R is an aliphatic saturated hydrocarbon group having 7-11 carbon atoms; Z is oxygen, sulfur or sulfoxide; $a$ is 1 or 2; $m$ is 0 to 1; $n$ is 0 or 1; $m+n$ all occurrences is 1; R' is $CH_2OH$ or $CH_3$; said structure (II) being:

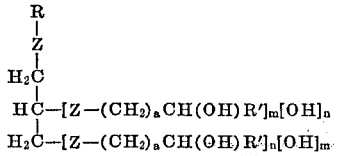

wherein R is an aliphatic saturated hydrocarbon group having 8-14 carbon atoms when R' is H or having 8-13 carbon atoms when R' is CH'OH or $CR_3$; Z is oxygen, sulfur or sulfoxide; $a$ is 1 or 2; $m$ is 0 or 1; $n$ is 0 or 1; $m+n$ all occurrences is 1; and R' is H, $CH_2OH$ or $CH_3$; said structure (III) being:

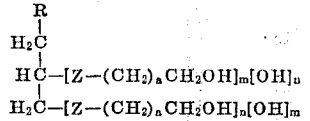

wherein R is an aliphatic saturated hydrocarbon group having 7-12 carbon atoms; Z is oxygen, sulfur or sulfoxide; $a$ is 1 or 2; $m$ is 0 or 1; $n$ is 0 or 1; and $m+n$ all occurrences is 1.

2. The method according to claim 1 in which the antimicrobial agent is selected from the group consisting of 2-hydroxydodecyl 2'-hydroxyethyl ether, 2-hydroxydecyl glyceryl ether, 2-hydroxydodecyl glyceryl ether, α-decyl-α'-hydroxyethyl glyceryl diether, α-dodecyl-α'-hydroxyethyl glyceryl diether, α-$C_{12}$-$C_{13}$ alkyl-α'-hydroxyethyl glyceryl diether, 2-hydroxy-$C_{11}$-$C_{14}$ alkyl glyceryl ether, 2-hydroxydecyl 2'-hydroxyethyl ether, 2-hydroxy-$C_{11}$-$C_{14}$ alkyl 2'-hydroxyethyl ether, 2-hydroxytetradecyl glyceryl ether, 2-hydroxytetradecyl 2'-hydroxyethyl ether, 2-hydroxytetradecyl 3'-hydroxypropyl ether, 2-hydroxytetradecyl 2'-hydroxypropyl ether, 2-hydroxydecyl-2'-hydroxypropyl ether, 2-hydroxydodecyl-2'-hydroxypropyl ether, 2-hydroxydodecyl 3'-hydroxypropyl ether, 2-hydroxytetradecyl 3'-hydroxybutyl ether, 2-hydroxydodecyl 2'-hydroxyethyl thioether, 2-hydroxydodecyl 2'-hydroxyethyl sulfoxide, 2-hydroxy-$C_{11}$-$C_{14}$ alkyl 2'-hydroxyethyl thioether, α-octyl-α'-hydroxyethyl glyceryl diether, α-dodecyl-α'-(3,4-hydroxybutyl) glyceryl diether and α-undecyl-α'-hydroxyethyl glyceryl di(thio)ether.

3. A method for combatting microbes selected from the group consisting of bacteria, fungi, molds and yeasts which comprises subjecting said microbes to an antimicrobially effective amount of a composition comprising an inert carrier for an antimicrobial agent and an antimicrobial agent having the structure (I), structure (II) or structure (III); said structure (I) being:

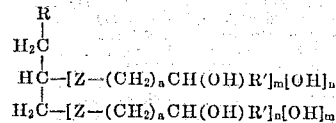

wherein R is an aliphatic saturated hydrocarbon group having 7-11 carbon atoms; Z is oxygen, sulfur or sulfoxide; $a$ is 1 or 2; $m$ is 0 or 1; $m+n$ all occurrences is 1; and R' is CH₂OH or CH₃; said structure (II) being:

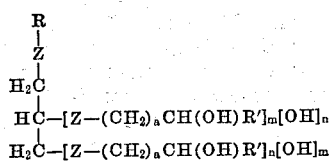

wherein R is an aliphatic saturated hydrocarbon group having 8–14 carbon atoms where R' is H or having 8–13 carbon atoms when R' is CH₂OH or CH₃; Z is oxygen, sulfur or sulfoxide; a is 1 or 2; m is 0 or 1; n is 0 or 1; m+n all occurrences is 1; and R' is H, CH₂OH or CH₃; said structure (III) being:

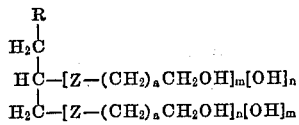

wherein R is an aliphatic saturated hydrocarbon group having 7–12 carbon atoms; a is 1 or 2; m is 0 or 1; n is 0 or 1; m+n all occurrences is 1; said composition having about 0.005% to 95% of said antimicrobial agent and about 99.995% to 5% of said inert carrier.

4. A method for combatting microbes selected from the group consisting of bacteria, fungi, molds and yeasts which comprises subjecting said microbes to an antimicrobially effective amount of a composition comprising a blend of two antimicrobial agents; said first antimicrobial agent having the structure:

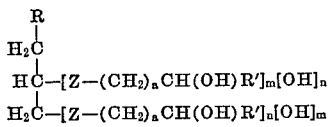

wherein R is an aliphatic saturated hydrocarbon group having 7–11 carbon atoms; Z is oxygen, sulfur or sulfoxide; a is 1 or 2; m is 0 or 1; n is 0 or 1; m+n all occurrences is 1; and R' is CH₂OH or CH₃; said second antimicrobial agent being selected from the group consisting of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5-tetrachlorosalicylanilide, 3,4,4'-trichlorocarbanilide; 2,2'-methylene-bis (3,4,6-trichlorophenol); o-phenylphenol; 4,2',4'-trichloro-2-hydroxy-diphenyl ether; 2-tridecyl imidazoline; cetyl trimethyl ammonium bromide; lauryl pyridinium bromide; lauryl isoquinolinium bromide; and mixtures thereof; said composition having about 1% to 99% of said first antimicrobial agent and about 99% to 1% of said second antimicrobial agent.

5. A method for combatting microbes selected from the group consisting of bacteria, fungi, molds and yeasts which comprises subjecting said microbes to an antimicrobially effective amount of a composition comprising a blend of two antimicrobial agents; said first antimicrobial agent having the structure:

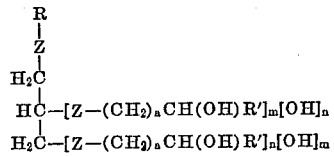

wherein R is an aliphatic saturated hydrocarbon group having 8–14 carbon atoms when R' is H or having 8–13 carbon atoms when R' is CH₂OH or CH₃; Z is oxygen, sulfur or sulfoxide; a is 1 or 2; m is 0 or 1; n is 0 or 1; m+n all occurrences is 1; and R' is H, CH₂OH or CH₃; said second antimicrobial agent being selected from the group consisting of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5-tetrachlorosalicylanilide, 3,4,4'-trichlorocarbanilide; 2,2'-methylene-bis(3,4,6-trichlorophenol); o-phenylphenol; 4,2',4'-trichloro-2-hydroxy-diphenyl ether; 2-tridecyl imidazoline; cetyl trimethyl ammonium bromide; lauryl pyridinium bromide; lauryl isoquinolinium bromide; and mixtures thereof; said composition having about 1% to 99% of said first antimicrobial agent and about 99% to 1% of said second antimicrobial agent.

6. A method for combatting microbes selected from the group consisting of bacteria, fungi, molds and yeasts which comprises subjecting said microbes to an antimicrobially effective amount of a composition comprising an inert carrier for an antimicrobial agent and a blend of two antimicrobial agents; said first antimicrobial agent having the structure:

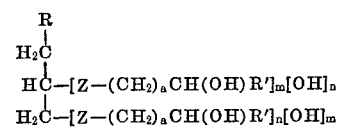

wherein R is an aliphatic saturated hydrocarbon group having 7–11 carbon atoms; Z is oxygen, sulfur or sulfoxide; a is 1 or 2; m is 0 or 1; n is 0 or 1; m+n all occurrences is 1; and R' is CH₂OH or CH₃; said second antimicrobial agent being selected from the group consisting of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4', 5-tetrachlorosalicylanilide, 3,4,4'-trichlorocarbananilide; 2,2'-methylene-bis (3,4,6-trichlorophenol); o-phenylphenol; 4,2',4'-trichloro-2-hydroxy-diphenyl ether; 2-tridecyl imidazoline; cetyl trimethyl ammonium bromide; lauryl pyridinium bromide; lauryl isoquinolinium bromide; and mixtures thereof; said composition having about 0.005% to 95% of said first antimicrobial agent, about 0.005% to 95% of said second antimicrobial agent and about 99.99% to 1% of said inert carrier.

7. The method according to claim 6 in which the inert carrier is a liquid selected from the group consisting of water, methanol, ethanol, propanol, glycol, hexylene glycol, acetone, xylene sulfonate and mixtures thereof.

8. A method for combatting microbes selected from the group consisting of bacteria, fungi, molds and yeasts which comprises subjecting said microbes to an antimocrobially effective amount of a composition comprising an inert carrier for an antimicrobial agent and a blend of two antimicrobial agents; said first antimicrobial agent having the structure:

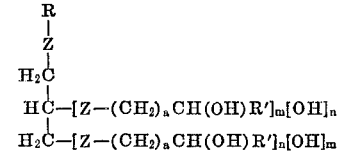

wherein R is an aliphatic saturated hydrocarbon group having 8–14 carbon atoms when R' is H or having 8–13 carbon atoms when R' is CH₂OH or CH₃; Z is oxygen, sulfur or sulfoxide; a is 1 or 2; m is 0 or 1; n is 0 or 1; m+n all occurrences is 1; and R' is H, CH₂OH or CH₃; said second antimicrobial agent being selected from the group consisting of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5 - tetrachlorosalicylanilide, 3,4,4' - trichlorocarbanilide; 2,2'-methylene-bis (3,4,6-trichlorophenol); o-phenylphenol; 4,2',4'-trichloro-2-hydroxy-diphenyl ether; 2-tridecyl imidazoline; cetyl trimethyl ammonium bromide; lauryl pyridinium bromide; lauryl isoquinolinium bromide; and mixtures thereof; said composition having about 0.005% to 95% of said first antimicrobial agent, about 0.005% to 95% of said second antimicrobial agent and about 99.99% to 1% of said inert carrier.

9. The method according to claim 8 in which the inert carrier is a liquid selected from the group consisting of water, methanol, ethanol, propanol, glycol, hexylene glycol, acetone, xylene sulfonate and mixtures thereof.

10. A composition for combatting microbes selected from the group consisting of bacteria, fungi, molds and yeast comprising a blend of two antimicrobial agents; said first antimicrobial agent having the structure:

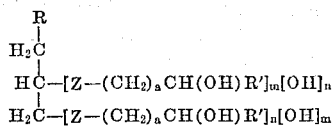

wherein R is an aliphatic saturated hydrocarbon group having 7–11 carbon atoms; Z is oxygen, sulfur or sulfoxide; $a$ is 1 or 2; $m$ is 0 or 1; $n$ is 0 or 1; $m+n$ all occurrences is 1; and R' is $CH_2OH$ or $CH_3$; said second antimicrobial agent being selected from the group consisting of 4'-monobromosalicylanilide, 5-monobromosalicylanilide, 4',5-dibromosalicylanilide, 3,5-dibromosalicylanilide, 3,4',5-tribromosalicylanilide, 3,4',5-trichlorosalicylanilide, 3,3',4',5 - tetrachlorosalicylanilide, 3,4,4' - trichlorocarbanilide; 2,2'-methylene-bis (3,4,6-trichlorophenol); o-phenylphenol; 4,2',4' - trichloro-2-hydroxy-diphenyl ether; 2-tridecyl imidazoline; cetyl trimethyl ammonium bromide; lauryl pyridinium bromide; lauryl isoquinolinium bromide; and mixtures thereof; said composition having about 1% to 99% of said first antimicrobial agent and about 99% to 1% of said second antimicrobial agent.

11. A composition for combatting microbes selected from the group consisting of bacteria, fungi, molds and yeast comprising a blend of two antimicrobial agents; said first antimicrobial agent having the structure:

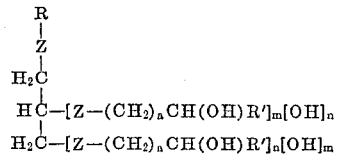

wherein R is an aliphatic saturated hydrocarbon group having 8–14 carbon atoms when R' is H or having 8–13 carbon atoms when R' is $CH_2OH$ or $CH_3$; Z is oxygen, sulfur or sulfoxide; $a$ is 1 or 2; $m$ is 0 or 1; $n$ is 0 or 1; $m+n$ all occurrences is 1; and R' is H, $CH_2OH$ or $CH_3$; said second antimicrobial agent being selected from the group consisting of 4'-monobromosalicylanilide, 5-monobromosalicylanilide, 4',5-dibromosalicylanilide, 3,5-dibromosalicylanilide, 3,4',5 - tribromosalicylanilide, 3,4',5-trichlorosalicylanilide, 3,3',4',5-tetrachlorosalicylanilide, 3,4,4'-trichlorocarbanilide; 2,2'-methylene-bis(3,4,6-trichlorophenol); o - phenylphenol; 4,2',4' - trichloro-2-hydroxy-diphenyl ether; 2-tridecyl imidazoline; cetyl trimethyl ammonium bromide; lauryl pyridinium bromide; lauryl isoquinolinium bromide; and mixtures thereof; said composition having about 1% to 99% of said first antimicrobial agent and about 99% to 1% of said second antimicrobial agent.

12. A composition for combatting microbes selected from the group consisting of bacteria, fungi, molds and yeast comprising an inert carrier for an antimicrobial agent and an antimicrobial agent having the structure:

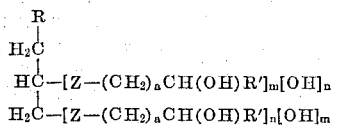

wherein R is an aliphatic saturated hydrocarbon group having 7–11 carbon atoms; Z is oxygen, sulfur or sulfoxide; $a$ is 1 or 2; $m$ is 0 or 1; $n$ is 0 or 1; $m+n$ all occurrences is 1; and R' is $CH_2OH$ or $CH_3$; said composition having about 0.005% to 95% of said antimicrobial agent and about 99.995% to 5% of said inert carrier.

13. A composition for combatting microbes selected from the group consisting of bacteria, fungi, molds and yeast comprising an inert carrier for an antimicrobial agent and an antimicrobial agent having the structure:

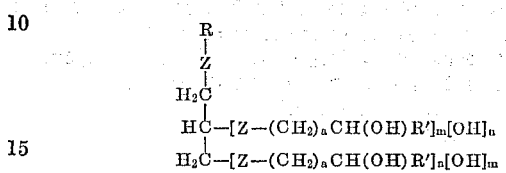

wherein R is an aliphatic saturated hydrocarbon group having 8–14 carbon atoms when R' is H or having 8–13 carbon atoms when R' is $CH_2OH$ or $CH_3$; Z is oxygen, sulfur or sulfoxide; $a$ is 1 or 2; $m$ is 0 or 1; $n$ is 0 or 1; $m+n$ all occurrences is 1; and R' is H, $CH_2OH$ or $CH_3$; said composition having about 0.005% to 95% of said antimicrobial agent and about 99.995% to 5% of said inert carrier.

14. A composition for combatting microbes selected from the group consisting of bacteria, fungi, molds and yeast which comprises an inert carrier for an antimicrobial agent and a blend of two antimicrobial agents; said first antimicrobial agent having the structure:

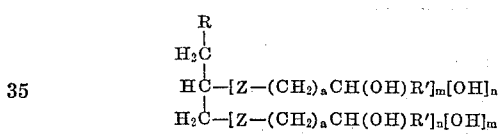

wherein R is an aliphatic saturated hydrocarbon group having 7–11 carbon atoms; Z is oxygen, sulfur or sulfoxide; $a$ is 1 or 2; $m$ is 0 or 1; $n$ is 0 or 1; $m+n$ all occurrences is 1; and R' is $CH_2OH$ or $CH_3$; said second antimicrobial agent being selected from the group consisting of 4' - monobromosalicylanilide, 5 - monobromosalicylanilide, 4',5 - dibromosalicylanilide, 3,5 - dibromosalicylanilide, 3,4',5 - tribromosalicylanilide, 3,4'5 - trichlorosalicylanilide, 3,3',4',5 - tetrachlorosalicylanilide, 3,4,4' - trichlorocarbanilide; 2,2' - methylene - bis (3,4,6-trichlorophenol); o-phenylphenol; 4,2',4' - trichloro - 2-hydroxy - diphenyl ether; 2 - tridecyl imidazoline; cetyl trimethyl ammonium bromide; lauryl pyridinium bromide; lauryl isoquinolinium bromide; and mixtures thereof; said composition having about 0.005% to 95% of said first antimicrobial agent, about 0.005% to 95% of said second antimicrobial agent and about 99.99% to 1% of said inert carrier.

15. A composition for combatting microbes selected from the group consisting of bacteria, fungi, molds and yeast which comprises an inert carrier for an antimicrobial agent and a blend of two antimicrobial agents; said first antimicrobial agent having the structure:

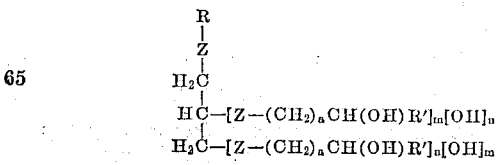

wherein R is an aliphatic saturated hydrocarbon group having 8–14 carbon atoms when R' is H or having 8–13 carbon atoms when R' is $CH_2OH$ or $CH_3$; Z is oxygen, sulfur or sulfoxide; $a$ is 1 or 2; $m$ is 0 or 1; $n$ is 0 or 1; $m+n$ all occurrences is 1; and R' is H, $CH_2OH$ or $CH_3$; said second antimicrobial agent being selected from the group consisting of 4'-monobromosalicylanilide, 5-monobromosalicylanilide, 4',5 - dibromosalicylanilide, 3,5 - dibromosalicylanilide, 3,4',5 - tribromosalicylanilide, 3,4',5-trichlorosalicylanilide, 3,3',4',5 - tetrachlorosalicylanilide, 3,4,4' - trichlorocarbanilide; 2,2' - methylene - bis (3,4,6-trichlorophenol); o-phenylphenol; 4,2',4' - trichloro - 2-hydroxy-diphenyl ether; 2 - tridecyl imidazoline; cetyl trimethyl ammonium bromide; lauryl pyridinium bromide; lauryl isoquinolinium bromide; and mixtures thereof; said composition having about 0.005% to 95% of said first antimicrobial agent, about 0.005% to 95% of said second antimicrobial agent and about 99.99% to 1% of said inert carrier.

References Cited

UNITED STATES PATENTS

| | | | |
|---|---|---|---|
| 3,240,819 | 3/1966 | Gaertner et al. | 260—615 |
| 3,427,248 | 2/1969 | Lamberti et al. | 260—615 |
| 3,475,540 | 10/1969 | Barr et al. | 424—324 |

ALBERT T. MEYERS, Primary Eaminer

N. A. DREZIN, Assistant Examiner

U.S. Cl. X.R.

424—258, 263, 273, 322, 329, 337, 340, 342, 346, 347

UNITED STATES PATENT OFFICE
CERTIFICATE OF CORRECTION

Patent No. 3,652,764      Dated March 28, 1972

Inventor(s) Vincent Lamberti and Henry Lemaire

It is certified that error appears in the above-identified patent and that said Letters Patent are hereby corrected as shown below:

Col. 1, line 49, "$HC-[Z-(CH_2)_a CH(OH)R']_m[OH]$," should be
-- $HC-[Z-(CH_2)_a CH(OH)R']_m[OH]_n$ Col. 2, line 19, "foxide a" should be --foxide; a--;

Col. 3, line 26, "chloreraesius" should be --choleraesius--;
        line 52, "33,5" should be --3, 5--;
        line 61, "contaiining" should be --containing--;

Col. 4, line 65, "hour." should be --hours.--;
        line 71, "Science" should be underscored--;

Col. 5, line 47, "alkyl-a'hydroxy..." should be --alkyl-a'-hydroxy..
        line 51, "(e) Control" should be (c) Control--;

Col. 6, line 34, "$C^{11-14}$" should be -- $C_{11-14}$--;

Col. 7, line 50, "m is 0 to 1" should be --m is 0 or 1--;
        line 62, "CH'OH" should be --$CH_2OH$-- and "$CR_3$" should be --$CH_3$--;

Col. 9, line 11, "where" should be --when--;

Col. 10, line 34, "3, 4, 4'-trichlorocarbananilide" should be --3,4,4'-trichlorocarbanilide--;
        line 69, Claim 8, "3,4,4'-tri" should have hyphen at end of line;

Col. 11, line 36, "yieast" should be --yeast--;

Col. 12, line 45, "3,4'5-trichloro..." should be --3,4',5-trichloro...--.

Signed and sealed this 7th day of November 1972.

(SEAL)
Attest:

EDWARD M. FLETCHER, JR.
Attesting Officer

ROBERT GOTTSCHALK
Commissioner of Patents